(12) United States Patent
Miyake

(10) Patent No.: US 12,418,961 B2
(45) Date of Patent: Sep. 16, 2025

(54) FIRST COMMUNICATION DEVICE, SECOND COMMUNICATION DEVICE, AND NON-TRANSITORY COMPUTER-READABLE RECORDING MEDIUM STORING COMPUTER-READABLE INSTRUCTIONS FOR FIRST COMMUNICATION DEVICE

(71) Applicant: BROTHER KOGYO KABUSHIKI KAISHA, Nagoya (JP)

(72) Inventor: Takeshi Miyake, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 382 days.

(21) Appl. No.: 17/327,901

(22) Filed: May 24, 2021

(65) Prior Publication Data

US 2021/0378055 A1 Dec. 2, 2021

(30) Foreign Application Priority Data

May 28, 2020 (JP) ................. 2020-093746

(51) Int. Cl.
*H04W 88/04* (2009.01)
*H04W 12/50* (2021.01)
(Continued)

(52) U.S. Cl.
CPC .......... *H04W 88/04* (2013.01); *H04W 12/50* (2021.01); *H04W 76/12* (2018.02); *H04W 76/14* (2018.02); *H04W 76/15* (2018.02)

(58) Field of Classification Search
None
See application file for complete search history.

(56) References Cited

U.S. PATENT DOCUMENTS

| 9,907,016 | B2 * | 2/2018 | Shibata ................. H04W 48/18 |
| 2010/0165879 | A1 | 7/2010 | Gupta et al. |
| 2015/0304805 | A1 * | 10/2015 | Suzuki ................. H04W 76/11 455/41.1 |

(Continued)

FOREIGN PATENT DOCUMENTS

| JP | 2016-152430 A | 8/2016 |
| JP | 2017-017601 A | 1/2017 |

(Continued)

OTHER PUBLICATIONS

Device Provisioning Protocol Technical Specification Version 1.1, created by the Wi-Fi Alliance.
(Continued)

*Primary Examiner* — Derrick W Ferris
*Assistant Examiner* — Keith Follansbee
(74) *Attorney, Agent, or Firm* — Scully, Scott, Murphy & Presser, PC

(57) ABSTRACT

The first communication device may establish a first wireless connection according to a Wi-Fi standard with a second communication device different from the first communication device via a first wireless interface among one or more wireless interfaces of the first communication device. The first wireless connection may be for the first communication device to operate as a parent station of a first wireless network and the second communication device to operate as a child station of the first wireless network. The first communication device may send, in a case where the first wireless connection is established, first wireless setting to the second communication device via the first wireless interface using the first wireless connection. The first wireless setting may be information for a recipient communication device to establish a specific wireless connection with a first access point different from the first communication device.

15 Claims, 8 Drawing Sheets

(51) Int. Cl.
*H04W 76/12* (2018.01)
*H04W 76/14* (2018.01)
*H04W 76/15* (2018.01)

(56) References Cited

U.S. PATENT DOCUMENTS

| | | | |
|---|---|---|---|
| 2016/0192429 A1* | 6/2016 | Nogawa | H04L 67/303 |
| | | | 370/329 |
| 2017/0005876 A1 | 1/2017 | Shibata | |
| 2017/0208214 A1* | 7/2017 | Asakura | H04N 1/00307 |
| 2017/0289097 A1* | 10/2017 | Balasingh | H04L 61/10 |
| 2018/0192291 A1 | 7/2018 | Shibata | |
| 2018/0212950 A1* | 7/2018 | Nogawa | H04N 1/00244 |
| 2018/0295662 A1 | 10/2018 | Kang | |
| 2020/0015307 A1 | 1/2020 | Naka et al. | |
| 2023/0075274 A1* | 3/2023 | Kamath | H04W 12/06 |

FOREIGN PATENT DOCUMENTS

| | | |
|---|---|---|
| JP | 2017-069717 A | 4/2017 |
| JP | 2018-042189 A | 3/2018 |
| JP | 2020-010139 A | 1/2020 |

OTHER PUBLICATIONS

Wi-Fi Peer-to-Peer (P2P) Technical Specification Version 1.1, created by the Wi-Fi Alliance.

Notice of Reasons for Refusal dated Mar. 5, 2024 received from the Japanese Patent Office in related JP 2020-093746 together with English language translation.

Notice of Reasons for Refusal dated Jul. 2, 2024 received from the Japanese Patent Office in related JP 2020-093746 together with English language translation.

* cited by examiner

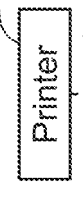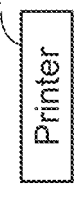
FIG. 4

(Continuation of FIG. 5)

FIRST COMMUNICATION DEVICE, SECOND COMMUNICATION DEVICE, AND NON-TRANSITORY COMPUTER-READABLE RECORDING MEDIUM STORING COMPUTER-READABLE INSTRUCTIONS FOR FIRST COMMUNICATION DEVICE

CROSS-REFERENCE TO RELATED APPLICATION

This application claims priority to Japanese Patent Application No. 2020-093746, filed on May 28, 2020, the entire contents of which are hereby incorporated by reference into the present application.

TECHNICAL FIELD

The disclosure herein relates to art for establishing a wireless connection between an access point and a communication device.

BACKGROUND ART

A communication system including an access point and a plurality of image forming devices is known. A first image forming device operates as an access point using an initial setting SSID under a state in which a connection with a target access point is not established. When finding the initial setting SSID under the state in which a connection with the target access point is not established, a second image forming device establishes a connection with the target access point. Then, the second image forming device establishes a connection with the first image forming device operating as the access point using the initial setting SSID, and sends wireless setting information for establishing a connection with the target access point to the first image forming device. When receiving the wireless setting information from the second image forming device, the first image forming device uses the wireless setting information to establish a connection with the target access point.

SUMMARY

The aforementioned technique merely describes that the second image forming device operating as a child station sends the wireless setting information to the first image forming device operating as a parent station (that is, the first image forming device operating as the access point using the initial setting SSID). The disclosure herein provides a novel technique for establishing a wireless connection between an access point and a communication device.

A first communication device disclosed herein may comprise: one or more wireless interfaces configured to execute wireless communication according to a Wi-Fi standard; and a controller, wherein the controller is configured to: establish a first wireless connection according to the Wi-Fi standard with a second communication device different from the first communication device via a first wireless interface among the one or more wireless interfaces, the first wireless connection being for the first communication device to operate as a parent station of a first wireless network and for the second communication device to operate as a child station of the first wireless network; and in a case where the first wireless connection is established, send a first wireless setting to the second communication device via the first wireless interface using the first wireless connection, the first wireless setting being information for a recipient communication device to establish a specific wireless connection with a first access point different from the first communication device.

Further, a second communication device disclosed herein may comprise: one or more wireless interfaces configured to execute wireless communication according to a Wi-Fi standard; and a controller, wherein the controller is configured to: establish a first wireless connection according to the Wi-Fi standard with a first communication device different from the second communication device via a first wireless interface among the one or more wireless interfaces, the first wireless connection being for the first communication device to operate as a parent station of a first wireless network and for the second communication device to operate as a child station of the first wireless network; in a case where the first wireless connection is established, receive a wireless setting from the first communication device via the first wireless interface using the first wireless connection, the wireless setting being information for establishing a specific wireless connection according to the Wi-Fi standard between the second communication device and a first access point different from the first communication device; and in a case where the wireless setting is received from the first communication device, establish a wireless connection with the first access point using the wireless setting via a second wireless interface among the one or more wireless interfaces.

A computer program for the above first communication device, a non-transitory computer-readable medium storing this computer program, and a method implemented by the first communication device are also novel and useful. Further, a computer program for the above second communication device, a non-transitory computer-readable medium storing this computer program, and a method implemented by the second communication device are also novel and useful. Further, a communication system that comprises the first communication device and the second communication device is also novel and useful.

BRIEF DESCRIPTION OF THE DRAWINGS

FIG. 4 is a sequence diagram continued from FIG. 3.

EMBODIMENTS

Figure 1:
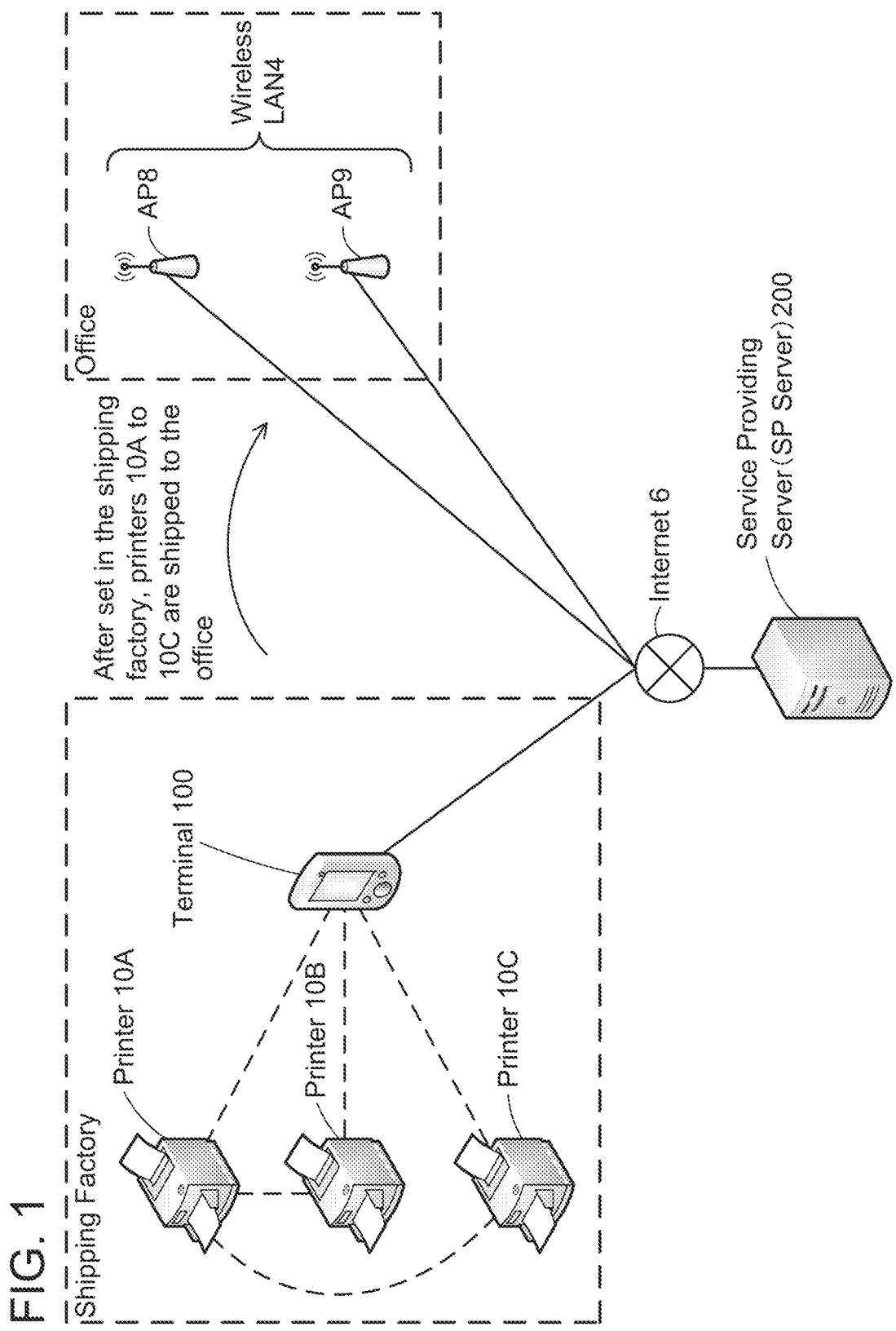
FIG. 1 shows an overview of an embodiment.

Overview of Embodiment; FIG. 1

An overview of an embodiment will be described with reference to FIG. 1. The present embodiment assumes a situation in which a setting process for establishing a Wi-Fi connection with an access point (hereinbelow termed "AP") is executed to each of three printers 10A to 10C stored in a shipping factory owned by a vendor of printers 10, the three printers 10A to 10C are shipped to an office, and then when the three printers 10A to 10C have been installed in the office, Wi-Fi connections are established between the three printers 10A to 10C and an AP in the office.

The shipping factory stores a plurality of printers including the three printers 10A to 10C. A worker in the shipping factory receives an order request for the three printers 10A to 10C, for example, from a worker in the office. In a variant, the order request may be for two printers or for four or more printers.

When receiving the order request, the worker in the shipping factory uses a terminal 100 to execute a setting process to each of the three printers 10A to 10C. The setting process is a process for facilitating establishment of Wi-Fi connections between the three printers 10A to 10C and an AP in the office after the three printers 10A to 10C have been installed in the office, and it is also a process for registering each of the printers 10A to 10C in a service providing server (hereinbelow termed simply "SP server") 200 on the Internet 6. The SP server 200 is set up on the Internet 6 by the vendor of the printers 10. In a variant, the SP server 200 may be set up on the Internet 6 by a business entity different from the vendor. The SP server 200 is configured to provide services related to the printers 10. In the present embodiment, the SP server 200 provides a shipping service of shipping cartridges to users of the printers 10.

The worker in the shipping factory selects one printer 10A from among the three printers and causes the terminal 100 to extract a public key of the printer 10A and a MAC address to be used for the printer 10A to operate as a parent station (e.g., as a SoftAP) (hereinbelow termed "parent station MAC address"). Then, various types of communication according to a Device Provisioning Protocol (DPP) scheme are executed between the printer 10A and the terminal 100 and the printer 10A stores information for establishing a Wi-Fi connection by which the printer 10A operates as a parent station (SoftAP in the in the present embodiment). Further, a Wi-Fi connection is established between the printer 10A and the terminal 100. The terminal 100 receives a PIN code from the SP server 200. A PIN code is information used for registering the printer 10 in the SP server 200. The terminal 100 sends the PIN code to the printer 10A using the Wi-Fi connection with the printer 10A.

After that, the worker in the shipping factory causes the terminal 100 to extract a public key of the printer 10B and a MAC address to be used for the printer 10B to operate as a child station (hereinbelow termed "child station MAC address"). Then, various types of communication according to the DPP scheme are executed between the printer 10A, the printer 10B, and the terminal 100, and the printer 10B stores information for establishing a Wi-Fi connection by which the printer 10B operates as a child station. Further, a Wi-Fi connection is established between the printer 10A and the printer 10B. The printer 10A sends the PIN code to the printer 10B using the Wi-Fi connection. After this, the worker in the shipping factory executes the similar processes between the printer 10A, the printer 10C, and the terminal 100. When the above-described setting processes are completed, the worker in the shipping factory ships the three printers 10A to 10C to the office.

APs 8 and 9 are in the office. The APs 8 and 9 form a wireless Local Area Network (LAN) 4. The APs 8 and 9 are connected to the Internet 6. When the printers 10A and 10B are turned on by the worker in the office, a Wi-Fi connection is established between the printer 10A, which is operating as a SoftAP, and the printer 10B, which is not operating as a SoftAP, by using the respective pieces of information for establishing a Wi-Fi connection which were stored in the printers 10A and 10B in the setting processes. Then, the worker in the office establishes a Wi-Fi connection by which the printer 10A operates as a child station between the printer 10A and the AP 8. When this Wi-Fi connection with the AP 8 is established, the printer 10A sends the PIN code to the SP server 200 via the AP 8. Thereby, the printer 10A is registered in the SP server 200. After this, the printer 10A sends a wireless setting (a service set identifier (SSID) and a password) for establishing a Wi-Fi connection with the AP 8 to the printer 10B using the Wi-Fi connection established with the printer 10B. Then, the Wi-Fi connection between the printer 10A and the printer 10B is disconnected, and the printer 10B establishes a Wi-Fi connection with the AP 8 using the wireless setting received from the printer 10A. Then, the printer 10B sends the PIN code to the SP server 200 via the AP 8. Thereby, the printer 10B is registered in the SP server 200. After this, the worker in the office executes similar processes between the printer 10A, the printer 10C, and the SP server 200. As a result, all of the three printers 10A to 10C are connected to the wireless network formed by the AP 8 and are registered in the SP server 200.

Figure 2:
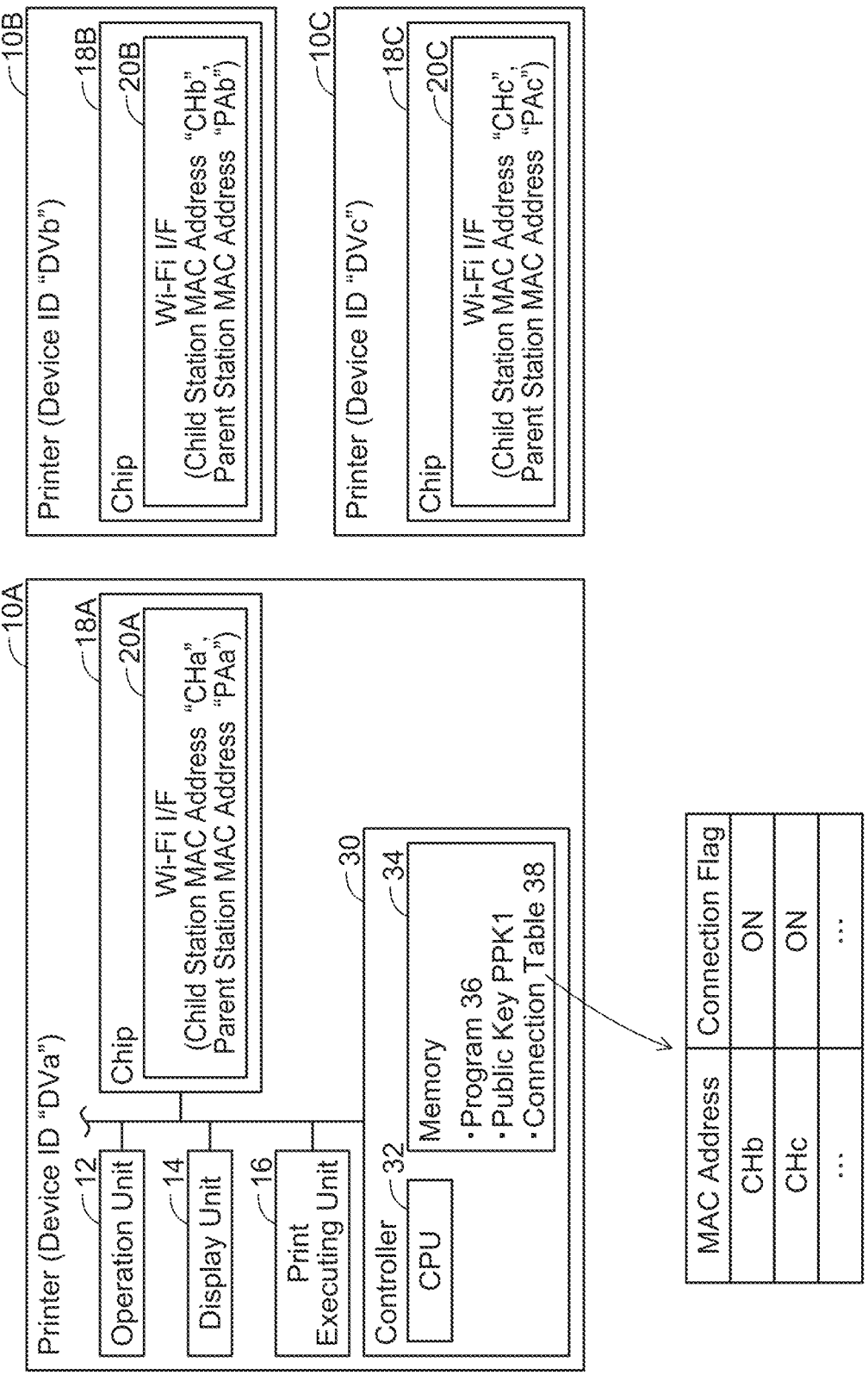
FIG. 2 shows hardware configurations of printers.

(Hardware Configurations of Printers 10A to 10C; FIG. 2)

Next, hardware configurations of the printers 10A to 10C will be described with reference to FIG. 2. The printer 10A is a peripheral device (e.g., a peripheral device of a PC, etc.) configured to execute a print function. In a variant, the printer 10A may be a multi-function device configured to execute a scan function, a FAX function, and/or the like in addition to the print function. The printer 10A includes an operation unit 12, a display unit 14, a print executing unit 16, a chip 18A, and a controller 30. The printer 10A is assigned with a device ID "DVa" for identifying the printer 10A.

The operation unit 12 includes a plurality of keys. A user can input various instructions to the printer 10A by operating the operation unit 12. The display unit 14 is a display configured to display various types of information. The print executing unit 16 includes a print mechanism of inkjet scheme, laser scheme, or the like.

The chip 18A includes a Wi-Fi interface (hereinbelow, an interface will be denoted simply as "I/F") 20A. The Wi-Fi I/F 20A is a wireless interface configured to execute communication according to a Wi-Fi standard. The Wi-Fi standard is a standard for executing wireless communication according to 802.11 standard of the IEEE (the Institute of Electrical and Electronics Engineers, Inc.) and standards complying thereto (such as 802.11a, 11b, 11g, 11n, etc.). The Wi-Fi I/F 20A supports both a DPP scheme and a Wi-Fi Direct (registered trademark) (WFD) scheme established by the Wi-Fi Alliance. The DPP scheme is a wireless communication scheme described in the specification "Device Provisioning Protocol Technical Specification Version 1.1" created by the Wi-Fi Alliance. The WFD scheme is a wireless communication scheme described in the specification "Wi-Fi Peer-to-Peer (P2P) Technical Specification Version 1.1" created by the Wi-Fi Alliance. The Wi-Fi I/F 20A is assigned with a child station MAC address "CHa" and a parent station MAC address "PAa".

The controller 30 includes a CPU 32 and a memory 34. The CPU 32 is configured to execute various processes in accordance with a program 36 stored in the memory 34. The memory 34 is configured of a volatile memory, a non-volatile memory, and the like. The memory 34 stores a public key "PPK1" of the printer 10A from before the printer 10A was shipped (i.e., from before the printer 10A was stored in the shipping factory). The memory 34 further stores a connection table 38. In the connection table 38, a MAC address and a connection flag are associated with each other. The connection flag indicates one of: a value "ON" indicating that a Wi-Fi connection has been established between an AP and a printer having the MAC address associated with the flag, and a value "OFF" indicating that a Wi-Fi connection is not being established between an AP and the printer having the MAC address associated with the flag.

The printer 10B is assigned with a device ID "DVb". The printer 10B has the same configuration as the printer 10A except that a Wi-Fi I/F 20B of a chip 18B is assigned with different child station MAC address and parent station MAC address. The Wi-Fi I/F 20B is assigned with a child station MAC address "CHb" and a parent station MAC address "PAb". The printer 10C is assigned with a device ID "DVc". The printer 10C has the same configuration as the printer 10A except that a Wi-Fi I/F 20C of a chip 18C is assigned with different child station MAC address and parent station MAC address. The Wi-Fi I/F 20C is assigned with a child station MAC address "CHc" and a parent station MAC address "PAc".

Figure 3:
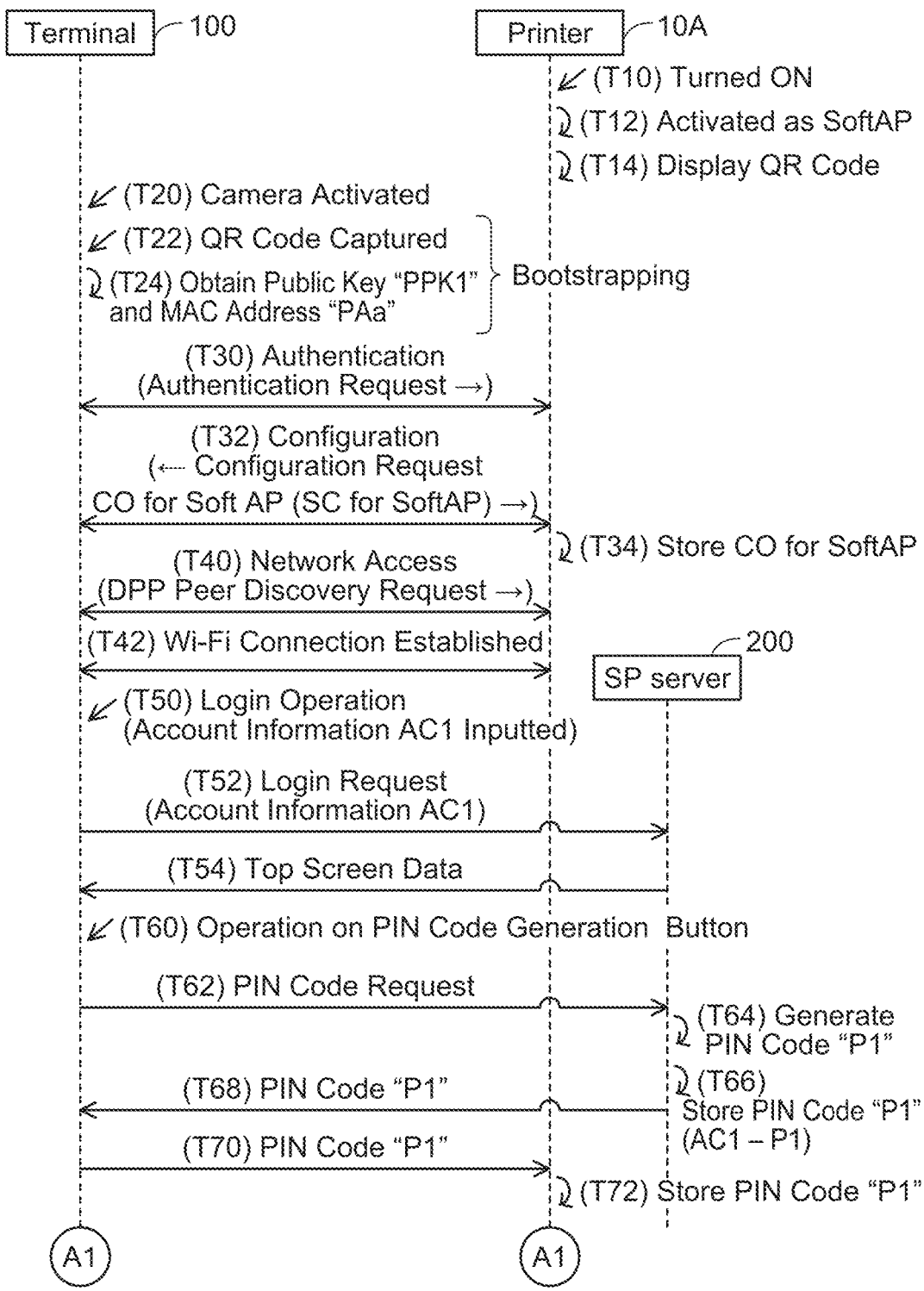
FIG. 3 is a sequence diagram of a shipping preparation process in a shipping factory.

(Shipping Preparation Process in Shipping Factory; FIG. 3)

Next, a shipping preparation process performed in the shipping factory will be described with reference to FIG. 3. In an initial state of FIG. 3, account information AC1 is already stored in a memory (not shown) of the SP server 200. The account information AC1 is information for authenticating the worker in the office. Hereinbelow, the printer 10A executes either communication using the child station MAC address "CHa" or communication using the parent station MAC address "PAa", whereas the printers 10B and 10C respectively execute communication using the child station MAC addresses "CHb" and communication using the child station MAC address "CHc" only. Thus, for easier understanding, the communication for which the printer 10A uses the child station MAC address "CHa" will be depicted by bold lines, the communication for which the printer 10A uses the parent station MAC address "PAa" will be depicted by thin lines, and the communication for which the printers 10B and 10C use the child station MAC addresses "CHb" and "CHc" will be depicted by thin lines. Further, each printer 10 executes communication via its Wi-Fi I/F 20. Thus, hereinbelow, a phrase "via the Wi-Fi I/F 20" will be omitted. Further, for easier understanding, processes executed by the CPUs (e.g., the CPU 32) of the respective devices (e.g., the printer 10) will be described with the respective devices (e.g., the printer 10A) as subjects of action instead of describing the respective CPUs as the subjects of action.

When the printer 10A accepts a turn-on operation from the worker in the shipping factory in T10, the printer 10A operates as a SoftAP in T12 and displays a QR code (registered trademark) in T14. This QR code is obtained by encoding the public key "PPK1" and the parent station MAC address "PAa" of the printer 10A.

When the terminal 100 accepts a camera activating operation from the worker in the shipping factory in T20, the terminal 100 activates a camera (not shown) of the terminal 100 and captures the QR code displayed on the printer 10A in T22. Then, in T24, the terminal 100 decodes the captured QR code and thereby acquires the public key "PPK1" and the parent station MAC address "PAa". In other words, the processes of T22 and T24 are Bootstrapping (hereinbelow denoted as "BS") of the DPP scheme executed between the terminal 100 and the printer 10A.

When the BS is completed, the terminal 100 executes Authentication (hereinbelow denoted as "Auth") of the DPP scheme with the printer 10A in T30. Specifically, the terminal 100 firstly generates a shared key using the public key "PPK1" and a private key of the terminal 100 (not shown) and generates encrypted data using this shared key. Then, the terminal 100 sends an Auth Request including the encrypted data and a public key of the terminal 100 (not shown) to the printer 10A. This Request is a signal requesting the printer 10A to execute authentication and further includes information indicating that the terminal 100 is to operate as a Configurator. Hereinbelow, a Request will be denoted as "Req".

When receiving the Auth Req from the terminal 100 (T30), the printer 10A executes authentication for the encrypted data included in the Auth Req. When the authentication is successful, the printer 10A sends an Auth Response indicating the success to the terminal 100. This Response includes information indicating that the printer 10A is to operate as an Enrollee. Hereinbelow, a Response will be denoted as "Res". As a result of the execution of the Auth, the terminal 100 is determined to operate as the Configurator and the printer 10A is determined to operate as the Enrollee. The Configurator means a device that sends a Configuration Object to an Enrollee in Configuration of the DPP scheme. Hereinbelow, the Configuration and the Configuration Object will respectively be denoted as "Config" and "CO". The Enrollee means a device that receives the CO from the Configurator in Config.

When sending the Auth Res to the terminal 100 (T30), the printer 10A executes Config of the DPP scheme with the terminal 100 in T32. Specifically, the printer 10A, which is the Enrollee, sends a Config Req to the terminal 100, which is the Configurator. This Req is a signal requesting the terminal 100 to send a CO for SoftAP. The CO for SoftAP is information used by the printer 10A operating as the SoftAP to establish a Wi-Fi connection.

When receiving the Config Req from the printer 10A (T32), the terminal 100 generates a CO for SoftAP. This CO for SoftAP includes a Signed-Connector (hereinbelow denoted as "SC") for SoftAP. Then, the terminal 100 sends a Config Req including the CO for SoftAP to the printer 10A (T32).

When receiving the Config Res from the terminal 100 (T32), the printer 10A stores the CO for SoftAP in the memory 34 in T34.

Next in T40, the terminal 100 executes Network Access (hereinbelow denoted simply as "NA") of the DPP scheme with the printer 10A. In this NA, the terminal 100 generates a CO for terminal including an SC for terminal. Then, the terminal 100 sends a DPP Peer Discovery Req including the CO for terminal to the printer 10A. This Req is a signal requesting the printer 10A to execute authentication. Hereinbelow, the DPP Peer Discovery will simply be denoted as "Discovery".

When receiving the Discovery Req from the terminal 100 (T40), the printer 10A executes authentication using the CO for terminal included in the Req. When the authentication is successful, the printer 10A generates a connection key and sends a Discovery Res including the SC for SoftAP in the CO for SoftAP to the terminal 100.

When receiving the Discovery Res from the printer 10A, the terminal 100 executes authentication using the SC for SoftAP included in the Res. When the authentication is successful, the terminal 100 generates a connection key. This generated connection key is the same as the connection key generated by the printer 10A. Thereby, the connection key is shared between the terminal 100 and the printer 10A.

The terminal 100 executes 4-way handshake communication with the printer 10A using the connection key. As a result, in T42, a Wi-Fi connection is established between the terminal 100 and the printer 10A. When the terminal 100 accepts a login operation including input of the account information AC1 in T50, the terminal 100 sends a login request including the account information AC1 to the SP server 200 in T52. In the present embodiment, the worker in the office informs the worker in the shipping factory of the account information AC1 in advance for the setting processes. In a variant, the account information AC1 may be created by the worker in the shipping factory. In this variant, the worker in the shipping factory informs the worker in the office of the account information AC1 by telephone or by email after the setting processes are completed.

When receiving the login request from the terminal 100 in T52, the SP server 200 determines that login is successful since it already stores the account information AC1 included in the request, and sends top screen data to the terminal 100 in T54.

When receiving the top screen data from the SP server 200 in T54, the terminal 100 displays a top screen represented by the top screen data. The top screen is a screen for setting information related to the user who uses the account information AC1, and includes a PIN code generation button for requesting generation of a PIN code. When the terminal 100 accepts an operation on the PIN code generation button from the worker in the shipping factory in T60, the terminal 100 sends a PIN code request to the SP server 200 in T62.

When receiving the PIN code request from the terminal 100 in T62, the SP server 200 generates a PIN code "P1" in T64 and stores the logged-in account information AC1 and the generated PIN code "P1" in association with each other in T66. Then, the SP server 200 sends the PIN code "P1" to the terminal 100 in T68.

When receiving the PIN code "P1" from the SP server 200 in T68, the terminal 100 sends the PIN code "P1" to the printer 10A in T70 by using the established Wi-Fi connection (see T42).

When receiving the PIN code "P1" from the terminal 100 in T70, the printer 10A stores the PIN code "P1" in T72. As above, the printer 10A can acquire the PIN code "P1" from the SP server 200 via the terminal 100 even in a situation where the printer 10A cannot access the SP server 200.

Next, when the printer 10B accepts a turn-on operation from the worker in the shipping factory in T110 of FIG. 4, it operates as a SoftAP in T112 and displays a QR code in T114. This QR code is obtained by encoding a public key "PPK2" and the parent station MAC address "PAb" of the printer 10B. Then, when the printer 10B accepts a SoftAP stopping operation from the worker in the shipping factory in T116, it stops operating as the SoftAP in T118 and displays a QR code again in T120. This QR code is obtained by encoding the public key "PPK2" and the child station MAC address "CHb" of the printer 10B.

T130 to T134 are the same as T20 to T24 of FIG. 3 respectively except that the public key "PPK2" and the child station MAC address "CHb" are acquired. T140 is the same as T30 except that the communication counterpart is the printer 10B. T142 is the same as T32 except that the communication counterpart is the printer 10B and the CO generated by the terminal 100 is a CO for second printer. The CO for second printer includes an SC for second printer. When receiving a Config Res including the CO for second printer from the terminal 100 (T142), the printer 10B stores the CO for second printer in T144.

T150 and T152 are the same as T40 and T42 of FIG. 3 respectively except that the communication counterparts are the printers 10A and 10B, and the SC for SoftAP and the SC for second printer are used. As a result, a Wi-Fi connection by which the printer 10A operates as a parent station (i.e., SoftAP) of a wireless network (hereinbelow "SoftAP NW") and the printer 10B operates as a child station of the SoftAP NW is established. That is, the Wi-Fi connection is established using the parent station MAC address "PAa" of the printer 10A and the child station MAC address "CHb" of the printer 10B. When the communication for establishing the Wi-Fi connection is executed, the printer 10A receives the child station MAC address "CHb" from the printer 10B and stores it in the connection table 38 in T154. Then in T160, the printer 10A uses the established Wi-Fi connection to send the device ID "DVa" and the PIN code "P1" to the printer 10B.

When receiving the device ID "DVa" and the PIN code "P1" from the printer 10A in T160, the printer 10B stores the device ID "DVa" and the PIN code "P1" in T162.

After that, when the worker in the shipping factory turns the printer 10C on, processes similar to T110 to T162 are executed between the printers 10A, the printer 10C, and the terminal 100. As a result, the printer 10C stores a CO for third printer including an SC for third printer generated by the terminal 100 (T144). Further, a Wi-Fi connection by which the printer 10A operates as the parent station of the SoftAP NW and the printer 10C operates as a child station of the SoftAP NW is established (T152). That is, the Wi-Fi connection is established using the parent station MAC address "PAa" of the printer 10A and the child station MAC address "CHc" of the printer 10C. In this case, the printer 10C participates, as a child station, in the SoftAP NW that is the same as the wireless network formed in T152 of FIG. 4. Here, "a wireless network is the same as another wireless network" means that SSIDs of parent stations of these wireless networks are the same. Further, the printer 10A stores the child station MAC address "CHc" of the printer 10C in the connection table 38 (T154), and the printer 10C stores the device ID "DVa" and the PIN code "P1" (T162).

After that, the printers 10A to 10C are turned off by the worker in the shipping factory. Then, the worker in the shipping factory ships the three printers 10A to 10C to the office of the company.

Figure 5:
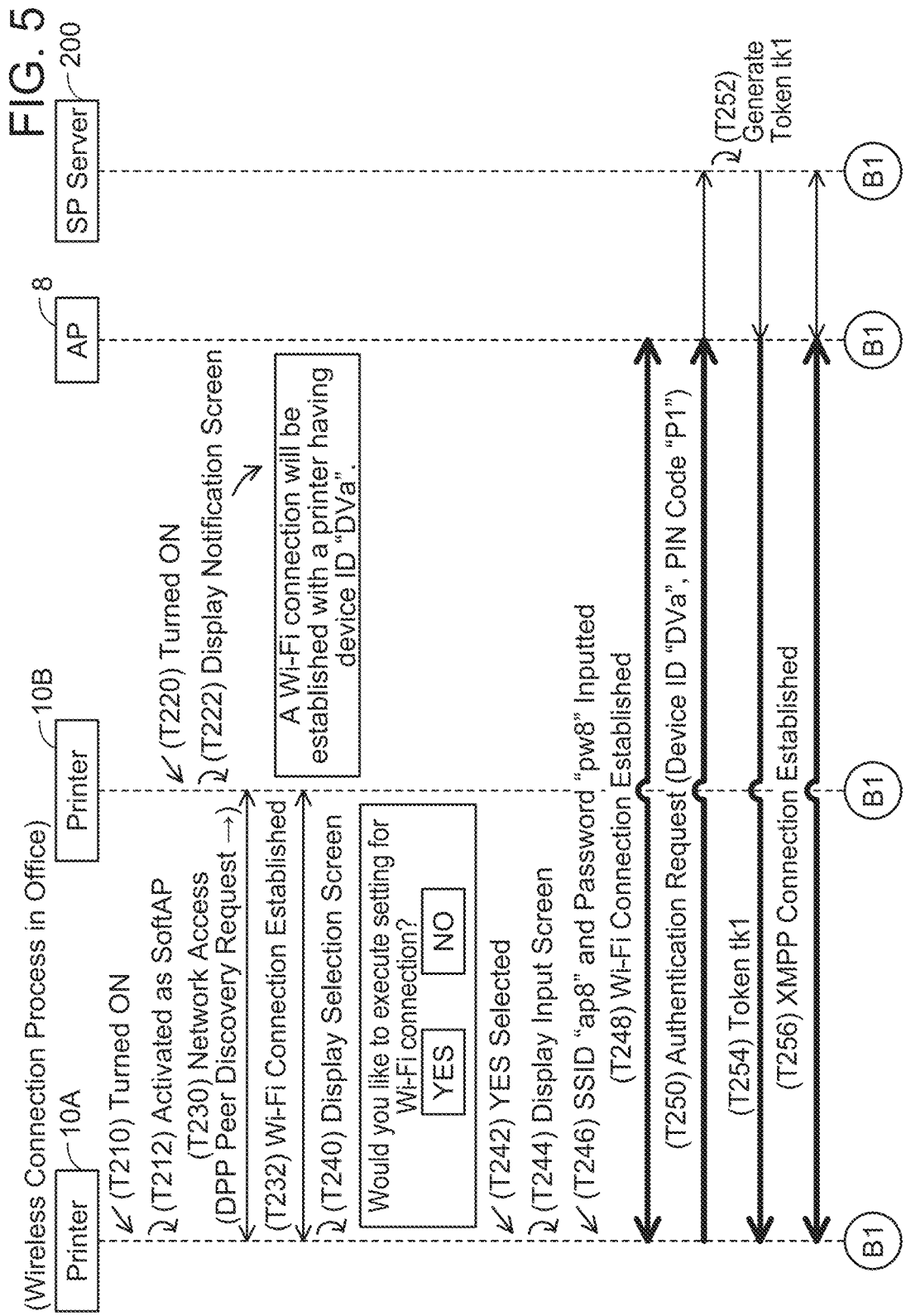
FIG. 5 is a sequence diagram of a wireless connection process in an office.
Figure 6:
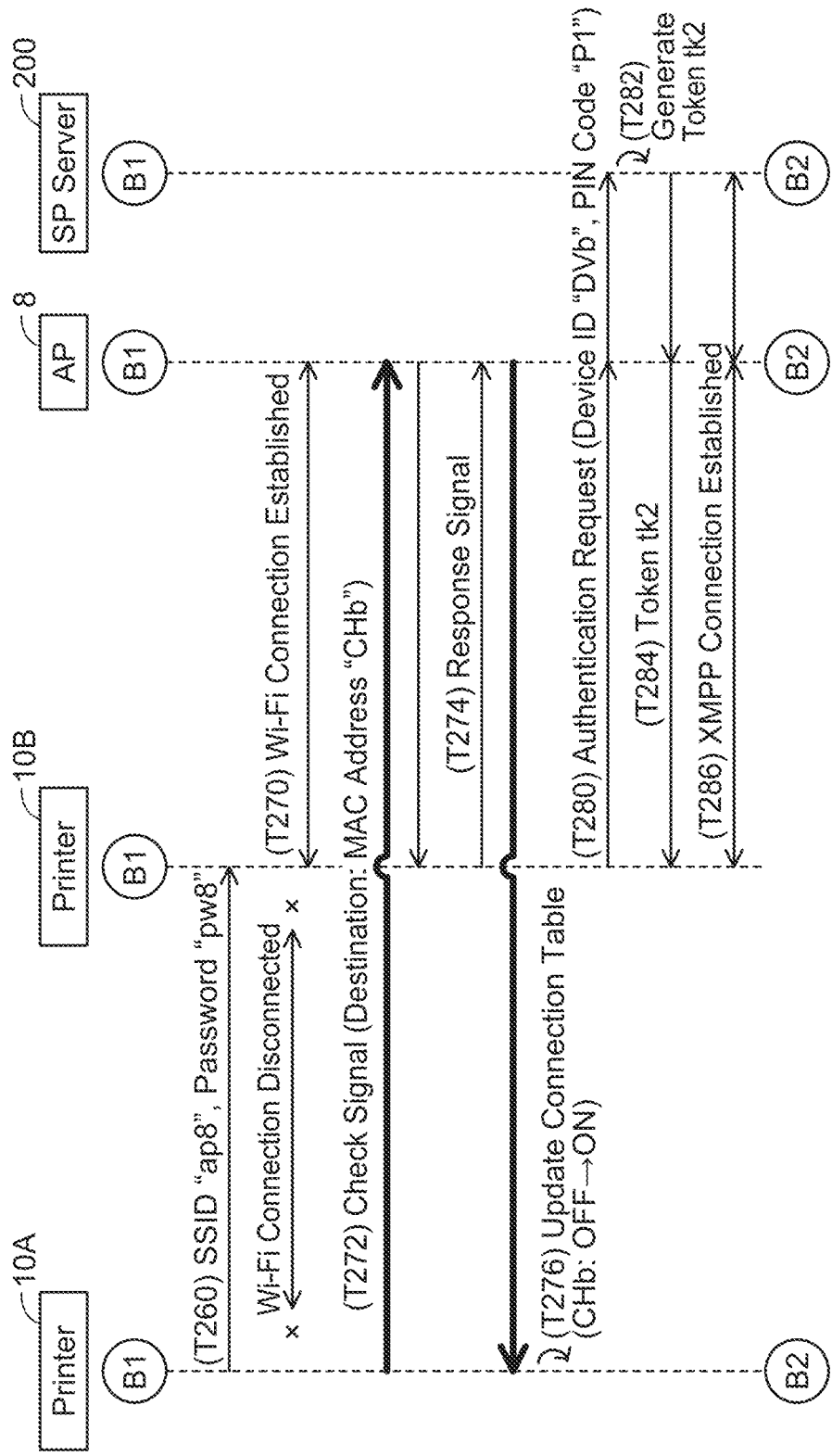
FIG. 6 is a sequence diagram continued from FIG. 5.
Figure 7:
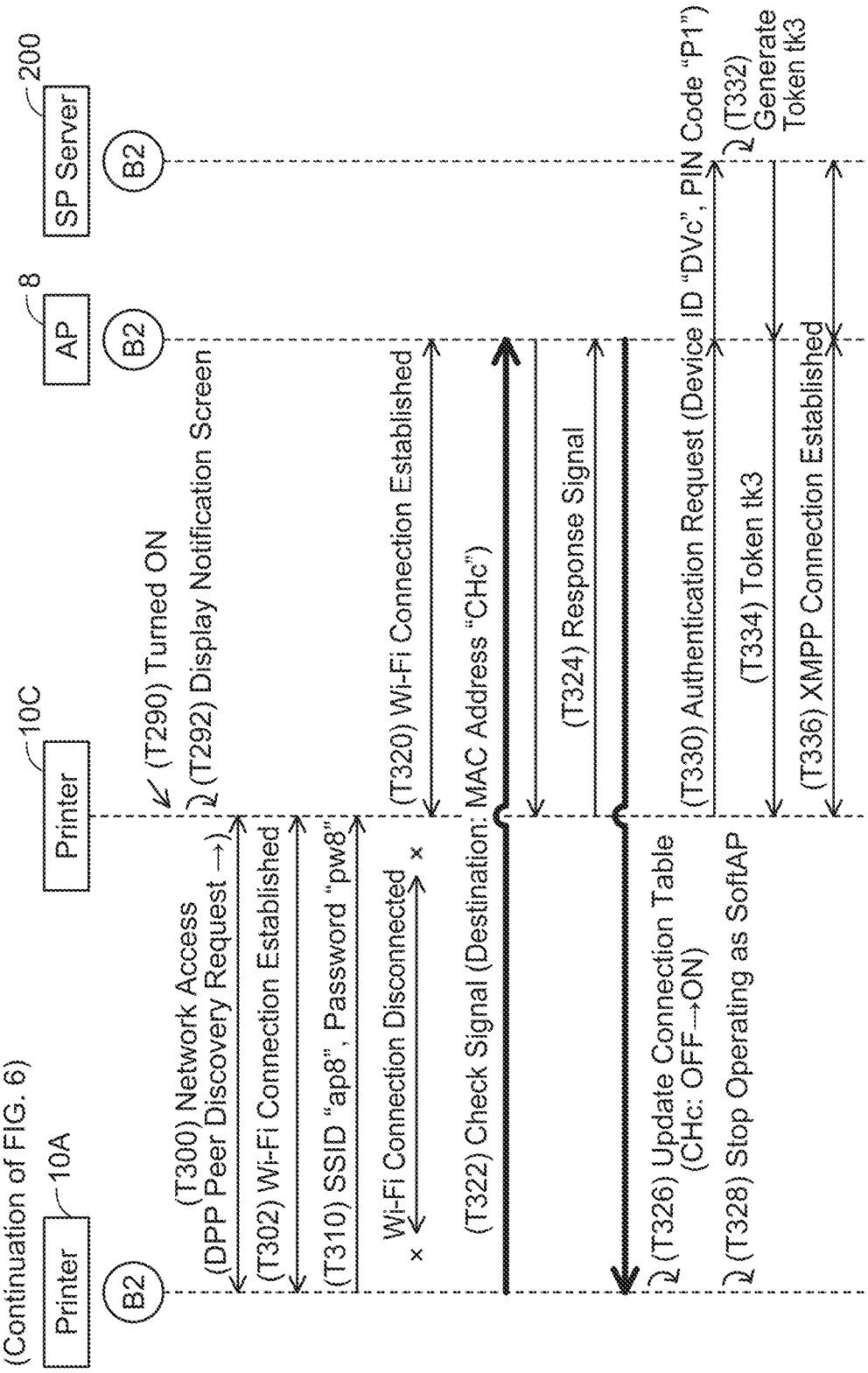
FIG. 7 is a sequence diagram continued from FIG. 6.

(Wi-Fi Connection Process in Office; FIGS. 5 to 7)

Next, a Wi-Fi connection process executed in the office will be described with reference to FIGS. 5 to 7. In an initial state of FIG. 5, the printer 10A, the printer 10B, and the printer 10C already store the CO for SoftAP, the CO for second printer, and the CO for third printer, respectively. Further, the printer 10A already stores the PIN code "P1" and the printers 10B and 10C already store the device ID "DVa" and the PIN code "P1". Further, the child station MAC addresses "CHb" and "CHc" are already stored in the connection table 38 of the printer 10A, and each MAC address is already associated with the connection flag "OFF".

When the printer 10A accepts a turn-on operation from the worker in the office in T210, the printer 10A operates as a SoftAP in T212. The printer 10A determines that the CO for SoftAP is in the memory 34 and executes processes from S230 without displaying the QR code.

When the printer 10B accepts a turn-on operation from the worker in the office in T220, the printer 10B determines that the CO for second printer is in the printer 10B and displays a notification screen in T222. When the CO for second printer is not in the printer 10B, the printer 10B executes the processes of T110 to T114 of FIG. 4. The notification screen is a screen for notifying a user that a Wi-Fi connection will be established with the printer 10A having the device ID "DVa" stored in the printer 10B. Thereby, the worker in the office can acknowledge that a Wi-Fi connection with the printer 10A will be established.

Further, the notification screen can be prevented from being displayed in a situation in which a Wi-Fi connection with the printer 10A is not to be established. The notification screen is deleted when a predetermined time has elapsed since this screen started to be displayed. In a variant, the notification screen may include an OK button and the notification screen may be deleted when the OK button is selected.

T230 and T232 are the same as T150 and T152 of FIG. 4. In T232, the SC for SoftAP of the printer 10A and the SC for second printer of the printer 10B are used to establish, between the printer 10A and the printer 10B, a Wi-Fi connection by which the printer 10A operates as the parent station (i.e., SoftAP) of the SoftAP NW and the printer 10B operates as a child station of the SoftAP NW. That is, the Wi-Fi connection is established using the parent station MAC address "PAa" of the printer 10A and the child station MAC address "CHb" of the printer 10B. As above, the printer 10A establishes the Wi-Fi connection with the printer 10B by using the SC for SoftAP and the SC for second printer generated by the terminal 100. Thus, the printer 10A establishes the Wi-Fi connection with the printer 10B even without accepting an operation for establishing a Wi-Fi connection with the printer 10B. As such, convenience for the worker in the office can be improved.

In T240, the printer 10A displays a selection screen. The selection screen includes a message checking whether to execute a process for establishing a Wi-Fi connection, a YES button, and a NO button. This message is also for allowing the worker in the office to select whether to establish Wi-Fi connections between the printers 10B and 10C and an AP. Thereby, the worker in the office can select whether to establish Wi-Fi connections between the printers 10B and 10C and the AP. In a variant, the printer 10A may display the selection screen after T210 or T212. Then, when the printer 10A accepts selection of the YES button from the worker in the office in T242, the printer 10A displays in T244 an input screen for input of an SSID and a password of the wireless network formed by the AP with which a Wi-Fi connection is to be established. When the printer 10A accepts input of an SSID "ap8" and a password "pw8" of the wireless network formed by the AP 8 (hereinbelow denoted as "first AP NW") from the worker in the office in T246, the printer 10A uses the inputted SSID "ap8" and password "pw8" in T248 to establish a Wi-Fi connection by which the AP 8 operates as a parent station of the first AP NW and the printer 10A operates as a child station of the first AP NW. That is, the Wi-Fi connection is established using the child station MAC address "CHa" of the printer 10A. As a result, the printer 10A can access the Internet 6 via the AP 8.

The printer 10A specifies the PIN code "P1" stored in the memory 34 and then sends an authentication request including the device ID "DVa" and the PIN code "P1" to the SP server 200 in T250. This authentication request is a signal that requests the SP server 200 to execute authentication using the PIN code in the request.

When receiving the authentication request from the printer 10A in T250, the SP server 200 determines that the PIN code "P1" in the request is already stored, that is, the authentication using the PIN code "P1" succeeds. In this case, the SP server 200 generates a token tk1 in T252 and sends the token tk1 to the printer 10A in T254. Further, the SP server 200 specifies the account information AC1 associated with the PIN code "P1" in the SP server 200 and stores the device ID "DVa" in association with the account information AC1. As a result, the printer 10A is registered in the SP server 200.

When receiving the token tk1 from the SP server 200 in T254, the printer 10A uses the token tk1 to establish an eXtensible Messaging and Presence Protocol (XMPP) connection with the SP server 200 in T256. The XMPP connection is a so-called full-time connection and is maintained until the printer 10A is turned off. By using the XMPP connection, the SP server 200 can send requests to the printers 10 beyond a firewall of the wireless LAN 4 to which the printers 10 belong, without receiving requests from the printers 10. Thereby, the SP server 200 is brought into a state in which it is capable of providing the shipping service to the printer 10A. Specifically, the SP server 200 receives remaining amount information of a cartridge attached to the printer 10A every predetermined time from the printer 10A and ships a new cartridge when the remaining amount information becomes equal to or less than a threshold.

In T260 of FIG. 6, the printer 10A sends the SSID "ap8" and the password "pw8" to the printer 10B using the Wi-Fi connection by which the printer 10A operates as the parent station (i.e., SoftAP). As above, the printer 10A sends the SSID "ap8" and the password "pw8" to the printer 10B after the Wi-Fi connection with the AP 8 has been established. Thus, a Wi-Fi connection can be surely established between the printer 10B and the AP 8.

When receiving the SSID "ap8" and the password "pw8" from the printer 10A in T260, the printer 10B disconnects the Wi-Fi connection with the printer 10A. Thereby, the printer 10B is enabled to establish a Wi-Fi connection using the child station MAC address "CHb". Then in T270, the printer 10B uses the SSID "ap8" and the password "pw8" received in T260 to establish a Wi-Fi connection by which the AP 8 operates as the parent station of the first AP NW and the printer 10B operates as a child station of the first AP NW. That is, the Wi-Fi connection is established using the child station MAC address "CHb" of the printer 10B. Thereby, the printer 10B can access the Internet 6 via the AP 8.

In T272, the printer 10A sends a check signal to the printer 10B via the AP 8 with the MAC address "CHb" as its recipient by using the Wi-Fi connection by which the printer 10A operates as the child station. In the present embodiment, the printer 10A has received the MAC address "CHb" from the printer 10B before the Wi-Fi connection in T232 is established. As such, a time required for the wireless connection process can be shortened as compared to a configuration in which the printer 10A receives the MAC address "CHb" from the printer 10B after the Wi-Fi connection in T232 has been established.

Since the Wi-Fi connection between the printer 10B and the AP 8 is already established, the printer 10A receives a response signal to the check signal from the printer 10B via the AP 8 in T274. As a result, the printer 10A can acknowledge that the Wi-Fi connection has been established between the printer 10B and the AP 8. In this case, the printer 10A updates the connection flag associated with the child station MAC address "CHb" in the connection table 38 from "OFF" to "ON" in T276.

T280 to T286 are the same as T250 to T256 of FIG. 5 except that the communication counterpart is the printer 10B and the device ID "DVb" and a token tk2 are used. As a result, the printer 10B is registered in the SP server 200 by the device ID "DVb" of the printer 10B being registered in the SP server 200.

When the printer 10C accepts a turn-on operation from the worker in the office in T290 of FIG. 7, the printer 10C determines that the CO for third printer is in the printer 10C and displays a notification screen in T292. T300 and T302 are the same as T230 and T232 of FIG. 5 except that the communication counterpart is the printer 10C. As a result, a Wi-Fi connection by which the printer 10A operates as a parent station (i.e., SoftAP) of a SoftAP NW and the printer 10C operates as a child station of the SoftAP NW is established. That is, the Wi-Fi connection is established using the parent station MAC address "PAa" of the printer 10A and the child station MAC address "CHc" of the printer 10C.

T310 to T324 are the same as 260 to T274 of FIG. 6 except that the communication counterpart is the printer 10C. In T322, the printer 10A sends a check signal to the printer 10C via the AP 8 with the MAC address "CHc" as its recipient by using the Wi-Fi connection by which the printer 10A operates as the child station. As described, the printer 10A sends the same SSID "ap8" and password "pw8" to the printers 10B and 10C (T260 of FIG. 5 and T310 of FIG. 7). Thus, it is possible to cause the printers 10B and 10C to participate in the same wireless network (i.e., the first AP NW) as child stations.

When receiving a response signal from the printer 10C via the AP 8 in T324, the printer 10A updates the connection flag associated with the child station MAC address "CHc" in the connection table 38 from "OFF" to "ON" in T326. Then, the printer 10A determines that the connection flags corresponding to all the MAC addresses stored in the connection table 38 are "ON", and terminates the operation as the SoftAP in T328. This reduces power consumption of the printer 10A as compared to a configuration in which the printer 10A maintains the operation as the SoftAP.

T330 to T336 are the same as T250 to T256 of FIG. 5 except that the communication counterpart is the printer 10C and the device ID "DVc" and a token tk3 are used. As a result, Wi-Fi connections are established between the AP 8 and the three printers 10A to 10C, and all of the three printers 10A to 10C are registered in the SP server 200.

As described, the printers 10B and 10C receive the PIN code "P1" from the printer 10A (T160 of FIG. 4), and thus they can achieve the registration of the device IDs "DVb" and "DVc" in the SP server 200 (T280 to T286 of FIG. 6, T330 to T336 of FIG. 7) without accepting input of the PIN code "P1" from the worker in the office. Thus, the convenience for the worker in the office can be improved. Further, the printer 10A can achieve the registration of the device ID "DVa" in the SP server 200 (T250 to T256 of FIG. 5) without accepting input of the PIN code. Thus, the convenience for the worker in the office can further be improved.

Further, the printer 10A sends the PIN code "P1" to the printers 10B and 10C (T160 of FIG. 4) by using the Wi-Fi connections of T152 in FIG. 4 which are established before the Wi-Fi connection is established in T232 of FIG. 5 and in T302 of FIG. 7. Thus, a time required for the registration of the device IDs "DVb" and "DVc" in the SP server 200 can be shortened as compared to a configuration in which the printer 10A sends the PIN code "P1" to the printers 10B and 10C using the Wi-Fi connection of T232 in FIG. 5 and of T302 in FIG. 7.

Further, the Wi-Fi connection is established between the printer 10A and the AP 8 (T248 of FIG. 5) and the Wi-Fi connection is also established between the printer 10B and the AP 8 (T270 of FIG. 6). Thus, the printers 10A and 10B can execute wireless communication via the AP 8.

Further, the printer 10A can establish both the Wi-Fi connection using the parent station MAC address "PAa" (e.g., T232 of FIG. 5) and the Wi-Fi connection using the child station MAC address "CHa" (e.g., T248 of FIG. 5) in parallel. Here, a printer according to a comparative example that cannot establish both a Wi-Fi connection using a parent station MAC address and a Wi-Fi connection using a child station MAC address in parallel will be described. After having established a Wi-Fi connection with the AP 8, the printer according to the comparative example disconnects the Wi-Fi connection with the AP 8. Then, after having established a Wi-Fi connection with the printer 10B, the printer according to the comparative example sends the SSID "ap8" and the password "pw8" to the printer 10B and then disconnects the Wi-Fi connection with the printer 10B. Then, the printer according to the comparative example establishes a Wi-Fi connection with the AP 8. As described, the printer according to the comparative example has to repeatedly execute establishment and disconnection of Wi-Fi connections. To the contrary, the printer 10A according to the present embodiment can send the SSID "ap8" and the password "pw8" to the printer 10B using the Wi-Fi connection established with the printer 10B while the Wi-Fi connection with the AP 8 is established. Thus, a time required for the establishment of the Wi-Fi connections between the printers 10A and 10B and the AP 8 can be shortened.

Figure 8:
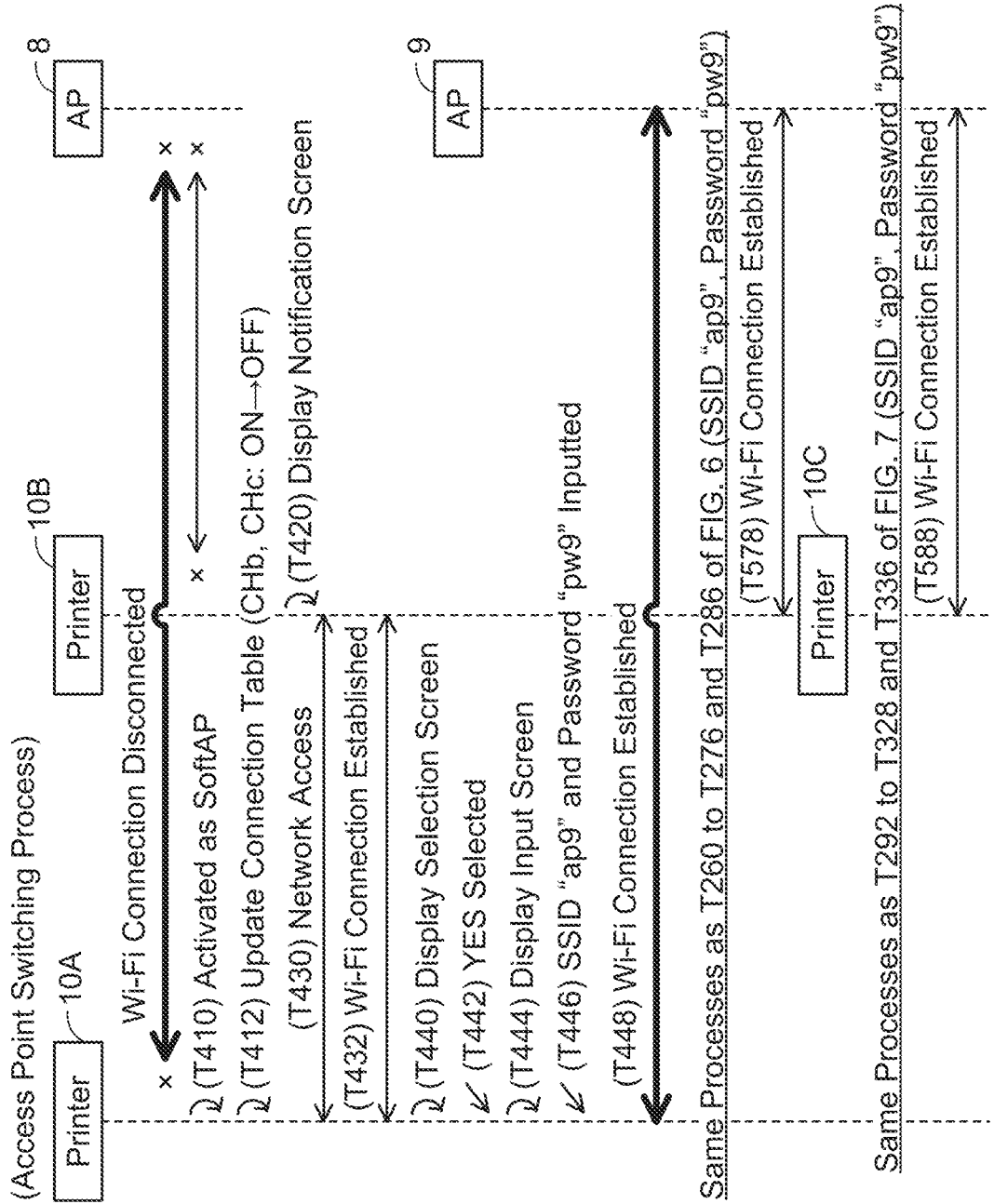
FIG. 8 is a sequence diagram of an access point switching process in the office.

(Access Point Switching Process; FIG. 8)

Next, an access point switching process will be described with reference to FIG. 8. In the access point switching process, the AP that the three printers 10A to 10C are establishing Wi-Fi connections with is switched. FIG. 8 is a state after FIG. 7.

The present case assumes, for example, a situation in which the AP 8 is turned off. In this case, the Wi-Fi connections between the three printers 10A to 10C and the AP 8 are disconnected.

When the printer 10A detects disconnection of the Wi-Fi connection with the AP 8, the printer 10A starts operating as the SoftAP in T410 and updates the connection flags associated with the child station MAC addresses "CHb" and "CHc" in the connection table 38 from "ON" to "OFF" in T412. The printer 10A determines that the CO for SoftAP is in the memory 34 and executes processes from S430 without displaying the QR code.

When the printer 10B detects disconnection of the Wi-Fi connection with the AP 8, the printer 10B determines that the CO for second printer is in the printer 10B and displays the notification screen in T420.

T430 to T444 are the same as T230 to T244 of FIG. 5. When the printer 10A accepts input of an SSID "ap9" and a password "pw9" of a wireless network formed by the AP 9 (hereinbelow denoted as "second AP NW") in T446, it uses the inputted SSID "ap9" and password "pw9" to establish in T448 a Wi-Fi connection by which the AP 9 operates as a parent station of the second AP NW and the printer 10A operates as a child station of the second AP NW. That is, the Wi-Fi connection is established using the child station MAC address "CHa" of the printer 10A.

After that, processes same as T260 to T276 and T286 of FIG. 6 are executed between the printer 10A, the printer 10B, and the AP 9. The printer 10A sends the SSID "ap9" and the password "pw9" to the printer 10B in T260. As a result, as shown in T578, a Wi-Fi connection by which the AP 9 operates as the parent station of the second AP NW and the printer 10B operates as a child station of the second AP NW is established between the printer 10B and the AP 9.

Further, processes same as T292 to T328 and T336 of FIG. 7 are executed between the printer 10A, the printer 10C, and the AP 9. The printer 10A sends the SSID "ap9" and the password "pw9" to the printer 10C in T310. As a result, as shown in T588, a Wi-Fi connection by which the AP 9 operates as the parent station of the second AP NW and the printer 10C operates as a child station of the second AP NW is established between the printer 10C and the AP 9. As a result, Wi-Fi connections are established between the AP 9 and the three printers 10A to 10C.

As described, in a case where the Wi-Fi connection with the AP 8 is disconnected (FIG. 8) after the Wi-Fi connection with the printer 10B has been disconnected (the disconnection of the Wi-Fi connection after T260), the printer 10A uses the SC for SoftAP and the SC for second printer to establish the Wi-Fi connection with the printer 10B (T432 of FIG. 8). Then, when the Wi-Fi connection with the printer 10B is established again (T432 of FIG. 8), the printer 10A sends the SSID "ap9" and the password "pw9" to the printer 10B. Thereby, the printer 10B can establish the Wi-Fi connection with the AP 9 after the Wi-Fi connection with the AP 8 has been disconnected.

Further, in the case where the Wi-Fi connection with the AP 8 is disconnected (FIG. 8) after the Wi-Fi connection with the printer 10B has been disconnected (the disconnection of the Wi-Fi connection after T260), the printer 10A displays the selection screen (T440). Thereby, the worker in the office can acknowledge that the Wi-Fi connection between the printer 10B and the AP 8 has been disconnected and can select whether to establish the Wi-Fi connection between the printer 10B and the AP 9.

Effects of Present Embodiment

According to the above configuration, the printer 10A establishes the Wi-Fi connection with the printer 10B by which the printer 10A operates as the parent station (i.e., SoftAP) and the printer 10B operates as the child station (T232 of FIG. 5) and uses this Wi-Fi connection to send the SSID "ap8" and the password "pw8", which are used in the first AP NW formed by the AP 8, to the printer 10B (T260 of FIG. 6). Thus, the printer 10B can establish the Wi-Fi connection with the AP 8 using the SSID "ap8" and the password "pw8" (T270).

Further, the printer 10B establishes the Wi-Fi connection with the printer 10A by which the printer 10A operates as the parent station (i.e., SoftAP) and the printer 10B operates as the child station (T232 of FIG. 5) and uses this Wi-Fi connection to receive the SSID "ap8" and the password "pw8", which are used in the first AP NW formed by the AP 8, from the printer 10A (T260 of FIG. 6). Thus, the printer 10B can establish the Wi-Fi connection with the AP 8 using the SSID "ap8" and the password "pw8" (T270).

(Corresponding Relationships)

In one aspect of the teachings disclosed herein, the printer 10A, the printer 10B, and the printer 10C are respectively an example of "first communication device", "second communication device", and "third communication device". The terminal 100 and the SP server 200 are respectively an example of "terminal device" and "server". The AP 8 and AP9 are respectively an example of "first access point" and "second access point". The Wi-Fi I/F 20A using the parent station MAC address "PAa" is an example of "first wireless interface" of the "first communication device". The Wi-Fi I/F 20A using the child station MAC address "CHa" is an example of "second wireless interface" of the "first communication device". The parent station MAC address "PAa" and the child station MAC address "CHa" are respectively an example of "first MAC address" and "second MAC address". The chip 18A is an example of "chip" of the "first communication device".

The Wi-Fi connection in T232 of FIG. 5 is an example of "first wireless connection". The Wi-Fi connection in T302 of FIG. 7 is an example of "second wireless connection". The Wi-Fi connection in T152 of FIG. 4 is an example of "third wireless connection". The Wi-Fi connection in T152 of FIG. 4 corresponding to the printer 10C is an example of "fourth wireless connection". The Wi-Fi connection in T248 of FIG. 5 is an example of "fifth wireless connection". The SoftAP NW is an example of "first wireless network", "second wireless network", "third wireless network", and "fourth wireless network". The SSID "ap8" and the password "pw8" are an example of "first wireless setting". The device ID "DVa", the device ID "DVb", and the device ID "DVc" are respectively an example of "first device information", "second device information", and "third device information". The PIN code "P1" is an example of "registration code". The child station MAC address "CHb" of the printer 10B is an example of "identification information of the second communication device". The SC for SoftAP and the SC for second printer are respectively an example of "first connection information" and "second connection information". The selection screen in T240 of FIG. 5 and the selection screen in T440 of FIG. 8 are respectively an example of "first selection screen" and "second selection screen". The SSID "ap9" and the password "pw9" are an example of "second wireless setting".

The process in T232 of FIG. 5 and the process in T260 of FIG. 6 are respectively an example of "establish a first wireless connection" and "send a first wireless setting".

In another aspect of the teachings disclosed herein, the printer 10A and the printer 10B are respectively an example of "first communication device" and "second communication device". The AP 8 is an example of "access point". The Wi-Fi OF 20B using the child station MAC address "CHb" is an example of "first wireless interface" and "second wireless interface" of the "second communication device". The child station MAC address "CHb" is an example of "first MAC address" and "second MAC address".

The Wi-Fi connection in T232 of FIG. 5 is an example of "first wireless connection". The Wi-Fi connection in T152 of FIG. 4 is an example of "second wireless connection". The SoftAP NW is an example of "first wireless network" and "second wireless network". The SSID "ap8" and the password "pw8" are an example of "wireless setting". The SC for second printer is an example of "connection information". The device ID "DVa" of the printer 10A is an example of "identification information of the first communication device".

The process in T232 of FIG. 5, the process in T260, and the process in T270 of FIG. 6 are respectively an example of "establish a first wireless connection", "receive a wireless setting from the first communication device", and "establish a wireless connection with the first access point".

(First Variant) The "parent station" is not limited to the SoftAP and may be a G/O of the WFD scheme. In the present variant, the printer 10A may, for example, autonomously shift to the G/O of the WFD scheme in T212 of FIG. 5 after having accepted the turn-on operation, and a Wi-Fi connection by which the printer 10A operates as the G/O of the WFD scheme and the printer 10B operates as a client of the WFD scheme may be established in T232. In another variant, the printer 10A may be configured to operate as the G/O in response to a G/O negotiation being executed between the printer 10A and the printer 10B.

(Second Variant) The printer 10A may send SSIDs and passwords that are different from each other to the printers 10B and 10C. For example, the printer 10A may send the SSID "ap8" and the password "pw8" to the printer 10B and send the SSID "ap9" and the password "pw9" to the printer 10C.

(Third Variant) The wireless network to which the printer 10A and the printer 10B belong in T232 may be different from the wireless network to which the printer 10A and the printer 10C belong in T234 of FIG. 5. For example, the wireless network in which the printer 10A operates as the SoftAP may be formed in T232 and a wireless network in which the printer 10B operates as the G/O of the WFD scheme may be formed in T234. That is, the "first wireless network" may be different from the "second wireless network".

(Fourth Variant) The SP server 200 may be omitted. In this variant, T50 to T72 of FIGS. 3, T160 and T162 of FIG. 4, T280 to T286 of FIG. 6, and T330 to T336 of FIG. 7 may be omitted. In the present variant, "acquire a registration code", "send the registration code to the second communication device", and "send the registration code to the third communication device" executed by the "first communication device" may be omitted. Moreover, T250 to T256 of FIG. 5 may be omitted. In the present variant, "send first device information to register the first device information in the server" executed by the "first communication device" may be omitted.

(Fifth Variant) The PIN code "P1" may be stored in advance in the printer 10A. In the present variant, T50 to T72 of FIG. 3 may be omitted. Further in another variant, the same processes as T50 to T68 of FIG. 3 may be executed between the printer 10A and the SP server 200 after T248 of FIG. 5. In the present variant, "acquire a registration code", "establish a third wireless connection", and "establish a fourth wireless connection" executed by the "first communication device may be omitted.

(Sixth Variant) T248 of FIG. 5 may be omitted. In the present variant, "establish a fifth wireless connection" executed by the "first communication device" may be omitted.

(Seventh Variant) Instead of T248, the printer 10A may establish a Wi-Fi connection with the AP 8 after T260 of FIG. 6, that is, after the SSID "ap8" and the password "pw8" have been sent to the printer 10B.

(Eighth Variant) The printer 10A may be configured not to establish the Wi-Fi connection using the parent station MAC address "PAa" and the Wi-Fi connection using the child station MAC address "CHa" in parallel. Further, a single MAC address may be assigned to the Wi-Fi I/F 20A of the printer 10A. In these variants, for establishing a Wi-Fi connection between the printer 10B and the AP 8, the printer 10A may execute T240 to T248 without executing T230 and T232 of FIG. 5, and then disconnect the Wi-Fi connection with the AP 8 and execute T260 of FIG. 6. Then, the printer 10A may disconnect the Wi-Fi connection with the printer 10B, and then establish a Wi-Fi connection with the AP 8 and execute T272 to T276.

(Ninth Variant) The printer 10A may comprise a chip with a Wi-Fi I/F to which the parent station MAC address "PAa" is assigned and a chip with a Wi-Fi I/F to which the child station MAC address "CHa" is assigned. That is, the "first wireless interface" and the "second wireless interface" may be configured of different chips.

(Tenth Variant) The printer 10A may not send the check signals. In the present variant, T152 and T154 of FIGS. 4, T272 and T274 of FIG. 6, and T322, T324, and T328 of FIG. 7 may be omitted. In the present variant, "cause the first communication device to stop operating as the parent station of the first wireless network", "receive identification information of the second communication device", and "check whether the first communication device is capable of communicating with the second communication device" executed by the "first communication device" may be omitted. In the present variant, the printer 10A may stop operating as the SoftAP when accepting an operation to cause the printer 10A to stop operating as the SoftAP from the worker in the office.

(Eleventh Variant) The printer 10A may receive the child station MAC address "CHb" from the printer 10B after T232 of FIG. 5 by using the Wi-Fi connection established in T232 of FIG. 5. Further in another variant, the printer 10A may receive the child station MAC address "CHb" from the printer 10B by using the Wi-Fi connection established in T152.

(Twelfth Variant) Instead of the check signal of T272, the printer 10A may send a check signal that does not include the recipient MAC address "CHb" by broadcasting and receive a response signal to this check signal from each of one or more devices that belong to the wireless LAN 4 in T274. In the present variant, the printer 10A may determine that a Wi-Fi connection has been established between the printer 10B and the AP 8 when receiving a response signal including the child station MAC address "CHb".

(Thirteenth Variant) Information for establishing a Wi-Fi connection between the printer 10A and the printer 10B may be stored in the printer 10A in advance. In the present variant, the processes of FIGS. 3 and 4 may be omitted. In the present variant, "receive first connection information" executed by the "first communication device" may be omitted.

(Fourteenth Variant) The printer 10A may not display the selection screen of T240 in FIG. 5. In the present variant, "display a first selection screen" executed by the "first communication device" may be omitted. Further, in another variant, the selection screen of T440 in FIG. 8 may be omitted. In the present variant, "display a second selection screen" executed by the "first communication device" may be omitted.

(Fifteenth Variant) The process of FIG. 8 may be omitted. In the present variant, "establish a fifth wireless connection", "disconnect the first wireless connection", "re-establish the first wireless connection", and "send a second wireless setting" executed by the "first communication device" may be omitted. In the present variant, for example, the printer 10A may execute the process of FIG. 8 when accepting an operation to switch APs from the worker in the office.

(Sixteenth Variant) The MAC address of the Wi-Fi I/F 20B of the printer 10B used in the Wi-Fi connection established in T232 of FIG. 5 may be different from the MAC address of the Wi-Fi OF 20B of the printer 10B used in the Wi-Fi connection established in T270 of FIG. 6.

(Seventeenth Variant) The printer 10B may not display the notification screen in T222 of FIG. 5. In the present variant, "display a notification screen" executed by the "second communication device" may be omitted.

(Eighteenth Variant) The device ID "DVa" of the printer 10A may be stored in advance in the printer 10B. In the present variant, T152 and T160 of FIG. 4 may be omitted. In the present variant, "establish a second wireless connection" and "receive the identification information" executed by the "second communication device" may be omitted. Further, the "identification information" is not limited to the device ID and may, for example, be the serial number of the printer 10A.

(Nineteenth Variant) The "parent station" is not limited to the SoftAP and may be a WFD G/O.

(Twentieth Variant) In the above embodiment, the processes of FIGS. 3 to 8 are implemented by software (e.g., program 36), however, at least one of these processes may be implemented by hardware such as a logic circuit.

What is claimed is:

1. A first communication device comprising:
one or more wireless interfaces configured to execute wireless communication according to a Wi-Fi standard;
a controller; and
a memory configured to store first identification information and second identification information, the first identification information being for identifying the first communication device and being used for the first communication device to operate as a parent station and the second identification information being for identifying a second communication device different from the first communication device and being used for the second communication device to operate as a child station,
wherein the controller is configured to:
  establish, without the second communication device being selected by a user, a first wireless connection according to the Wi-Fi standard with the second communication device via a first wireless interface among the one or more wireless interfaces by using the first identification information and the second identification information in the memory, the first wireless connection being for the first communication device to operate as a parent station of a first wireless network and for the second communication device to operate as a child station of the first wireless network;
  in a case where the first wireless connection is established, send a first wireless setting to the second communication device via the first wireless interface using the first wireless connection, the first wireless setting being information for a recipient communication device to establish a specific wireless connection with a first access point different from the first communication device;
  establish a second wireless connection according to the Wi-Fi standard with a third communication device different from the second communication device via the first wireless interface, the second wireless connection being for the first communication device to operate as a parent station of a second wireless network and for the third communication device to operate as a child station of the second wireless network;
  in a case where the second wireless connection is established, send to the third communication device the first wireless setting that has been sent to the second communication device via the first wireless interface using the second wireless connection;
  acquire a registration code generated by a server;
  send the registration code to the second communication device via the first wireless interface, wherein in a case where the registration code is sent to the second communication device, the registration code is sent from the second communication device to the server via the first access point to register second device information of the second communication device in the server;
  send the registration code to the third communication device via the first wireless interface, wherein in a case where the registration code is sent to the third communication device, the registration code is sent from the third communication device to the server via the first access point to register third device information of the third communication device in the server;
  before the first wireless connection is established, establish a third wireless connection according to the Wi-Fi standard with the second communication device via the first wireless interface, the third wireless connection being for the first communication device to operate as a parent station of a third wireless network and for the second communication device to operate as a child station of the third wireless network,
  send the registration code to the second communication device using the third wireless connection,
  before the second wireless connection is established, establish a fourth wireless connection according to the Wi-Fi standard with the third communication device via the first wireless interface, the fourth wireless connection being for the first communication device to operate as a parent station of a fourth wireless network and for the third communication device to operate as a child station of the fourth wireless network, and
  send the registration code to the third communication device using the fourth wireless connection.

2. The first communication device as in claim 1, wherein the second wireless network is same as the first wireless network.

3. The first communication device as in claim 1, wherein the controller is further configured to:
send first device information of the first communication device and the registration code to the server to register the first device information in the server.

4. The first communication device as in claim 1, wherein the controller is further configured to:
establish a specific wireless connection according to the Wi-Fi standard with the first access point using the first wireless setting via a second wireless interface among the one or more wireless interfaces after the first wireless connection with the second communication device has been established.

5. The first communication device as in claim 4, wherein the controller is configured to, after the specific wireless connection has been established, send the first wireless setting used for establishing the specific wireless connection to the second communication device via the first wireless interface using the first wireless connection.

6. The first communication device as in claim 4, wherein the first communication device is configured to establish in parallel both of the first wireless connection via the first wireless interface and the specific wireless connection via the second wireless interface.

7. The first communication device as in claim 4, wherein
a first MAC address is assigned to the first wireless interface,
a second MAC address different from the first MAC address is assigned to the second wireless interface, and
the first wireless interface and the second wireless interface are configured as one chip.

8. The first communication device as in claim 4, wherein the controller is further configured to:
cause the first communication device to stop operating as the parent station of the first wireless network in a case where the first communication device is capable of communicating with the second communication device via the second wireless interface and the first access point using the specific wireless connection after the first wireless setting has been sent to the second communication device.

9. The first communication device as in claim 8, wherein the controller is further configured to:
before the first wireless connection is established, receive identification information of the second communication device from the second communication device via the first wireless interface; and
check, by using the identification information, whether the first communication device is capable of communicating with the second communication device via the second wireless interface and the first access point using the specific wireless connection.

10. The first communication device as in claim 1, further comprising a display unit,
wherein the controller is further configured to:
in a case where the first communication device is turned on under a state where first connection information used to establish the first wireless connection is stored in the first communication device, display a first selection screen on the display unit, the first selection screen being for a user to select whether a wireless connection is to be established between the second communication device and the first access point,
wherein in a case where establishment of a wireless connection between the second communication device and the first access point is selected by the user on the first selection screen, the controller is configured to send the first wireless setting to the second communication device via the first wireless interface using the established first wireless connection.

11. The first communication device as in claim 1, wherein the controller is further configured to:
receive first connection information from a terminal device via the first wireless interface,
wherein the controller is configured to establish the first wireless connection with the second communication device via the first wireless interface using the first connection information and second connection information, and
the second connection information is sent from the terminal device to the second communication device.

12. The first communication device as in claim 1, wherein the memory is configured to store the first identification information and the second identification information before the first wireless connection is established.

13. A first communication device comprising:
one or more wireless interfaces configured to execute wireless communication according to a Wi-Fi standard;
a controller; and
a memory configured to store first identification information and second identification information, the first identification information being for identifying the first communication device and being used for the first communication device to operate as a parent station and the second identification information being for identifying a second communication device different from the first communication device and being used for the second communication device to operate as a child station,
wherein the controller is configured to:
establish, without the second communication device being selected by a user, a first wireless connection according to the Wi-Fi standard with the second communication device via a first wireless interface among the one or more wireless interfaces by using the first identification information and the second identification information in the memory, the first wireless connection being for the first communication device to operate as a parent station of a first wireless network and for the second communication device to operate as a child station of the first wireless network;
in a case where the first wireless connection is established, send a first wireless setting to the second communication device via the first wireless interface using the first wireless connection, the first wireless setting being information for a recipient communication device to establish a specific wireless connection with a first access point different from the first communication device;
establish a second wireless connection according to the Wi-Fi standard with a third communication device different from the second communication device via the first wireless interface, the second wireless connection being for the first communication device to operate as a parent station of a second wireless network and for the third communication device to operate as a child station of the second wireless network;
in a case where the second wireless connection is established, send to the third communication device the first wireless setting that has been sent to the second communication device via the first wireless interface using the second wireless connection;
acquire a registration code generated by a server;
send the registration code to the second communication device via the first wireless interface, wherein in a case where the registration code is sent to the second communication device, the registration code is sent from the second communication device to the server via the first access point to register second device information of the second communication device in the server;
send the registration code to the third communication device via the first wireless interface, wherein in a case where the registration code is sent to the third communication device, the registration code is sent from the third communication device to the server via the first access point to register third device information of the third communication device in the server; and
in a case where the registration code is sent from the server to a terminal device different from the first communication device, the controller is configured to acquire the registration code by receiving the registration code from the terminal device via the first wireless interface.

14. A first communication device comprising:
one or more wireless interfaces configured to execute wireless communication according to a Wi-Fi standard;
a controller; and
a memory configured to store first identification information and second identification information, the first identification information being for identifying the first communication device and being used for the first communication device to operate as a parent station and the second identification information being for identifying a second communication device different from the first communication device and being used for the second communication device to operate as a child station, wherein the controller is configured to:
  establish, without the second communication device being selected by a user, a first wireless connection according to the Wi-Fi standard with the second communication device via a first wireless interface among the one or more wireless interfaces by using the first identification information and the second identification information in the memory, the first wireless connection being for the first communication device to operate as a parent station of a first wireless network and for the second communication device to operate as a child station of the first wireless network;
  in a case where the first wireless connection is established, send a first wireless setting to the second communication device via the first wireless interface using the first wireless connection, the first wireless setting being information for a recipient communication device to establish a specific wireless connection with a first access point different from the first communication device;
  establish a specific wireless connection with the first access point using the first wireless setting;
  after the first wireless setting has been sent to the second communication device, disconnect the first wireless connection;
  in a case where the specific wireless connection is disconnected after the first wireless connection has been disconnected, re-establish the first wireless connection via the first wireless interface using first connection information and second connection information; and
  in a case where the first wireless connection is re-established, send a second wireless setting different from the first wireless setting to the second communication device via the first wireless interface using the first wireless connection, the second wireless setting being information for establishing a wireless connection between a recipient communication device and a second access point different from the first access point.

15. The first communication device as in claim 14, further comprising a display unit,
  wherein the controller is further configured to:
  in a case where the specific wireless connection is disconnected after the first wireless connection has been disconnected, display a second selection screen on the display unit, the second selection screen being for a user to select whether a wireless connection is to be established between the second communication device and the second access point,
  wherein in a case where establishment of a wireless connection between the second communication device and the second access point is selected by the user on the second selection screen, the controller is configured to send the second wireless setting to the second communication device via the first wireless interface using the re-established first wireless connection.

* * * * *